June 13, 1961   J. H. ANDERSON   2,988,322
DIAPHRAGM VALVE

Filed Jan. 25, 1955                               2 Sheets-Sheet 1

INVENTOR.
JOHN HARRY ANDERSON
BY
ATTORNEY.

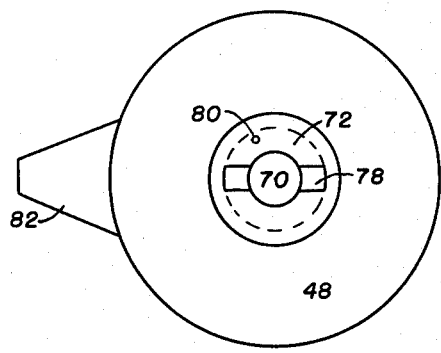
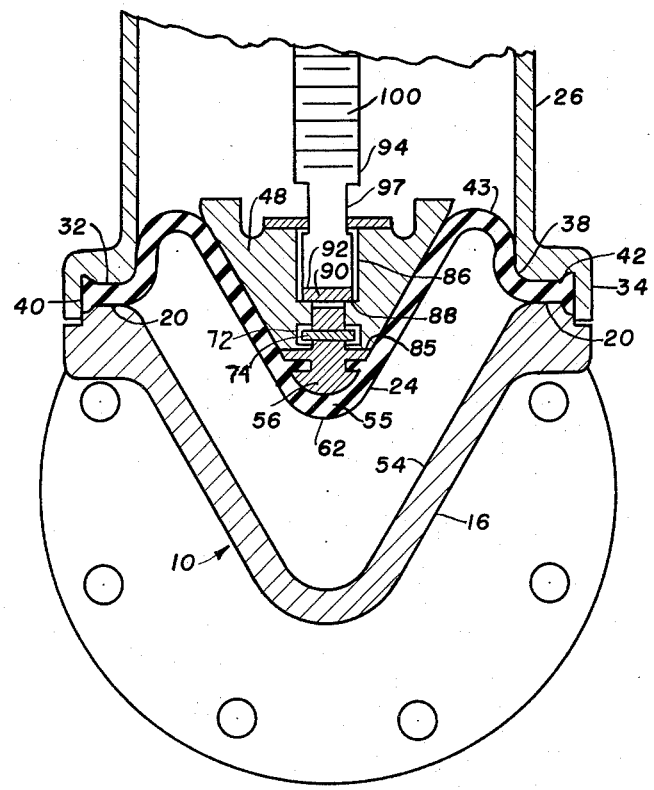
FIG. 3
FIG. 2
INVENTOR.
JOHN HARRY ANDERSON
BY Edward H. Lang
ATTORNEY.

United States Patent Office 2,988,322
Patented June 13, 1961

2,988,322
DIAPHRAGM VALVE

John Harry Anderson, Burlington, Wis., assignor to Hills-McCanna Company, Chicago, Ill., a corporation of Illinois
Filed Jan. 25, 1955, Ser. No. 483,960
3 Claims. (Cl. 251—331)

This invention is directed to diaphragm valves.

Conventional diaphragm valves are usually of the type in which the center of the diaphragm moves through a center position from open to closed position. The center position is a plane in which lies the clamped edge portion of the diaphragm. The diaphragm moves an equal distance to each side of the center position in passing from fully open to fully closed position in order to avoid undue distortion and strain on the diaphragm. In order to effect the equal movement on both sides of the center position, it is necessary to provide the valve with an upstanding weir requiring the fluid to follow a tortuous passage through the valve. Such valves have a further disadvantage in that they are not self-draining, i.e., some liquid is always held in the upstream side of the valve. A further disadvantage is that such valves cannot be readily cleaned without disassembling them because of the barrier formed by the raised weir between inlet and outlet.

Diaphragm valves of the type contemplated herein have been developed and overcome many of the above mentioned disadvantages, but such valves have the drawback of short diaphragm life and difficulty in closing against line pressure.

The object of this invention is to provide a novel valve which obviates the aforesaid objectionable features and to provide additional advantages.

More specifically, an object of the invention is to provide a novel diaphragm valve constructed in such manner as to prolong the life of the diaphragm.

Another object of the invention is to provide a substantially straight line flow diaphragm valve that can readily be closed against line pressure.

Another object of the invention is to provide a novel diaphragm for a diaphragm valve of the type contemplated herein.

A still further object of the invention is to provide a novel depressor plate-diaphragm assembly.

Other objects and advantages of the valve will be apparent from the following detailed description and accompanying drawing of which FIGURE 1 is a vertical cross-section of a valve embodying the novel features of the invention showing the valve in closed position;

FIGURE 2 is a fragmentary cross-section taken along the line 2—2 of FIGURE 1 showing the valve in open position;

FIGURE 3 is a bottom plan view of the compressor forming part of the novel valve.

Figure 1:
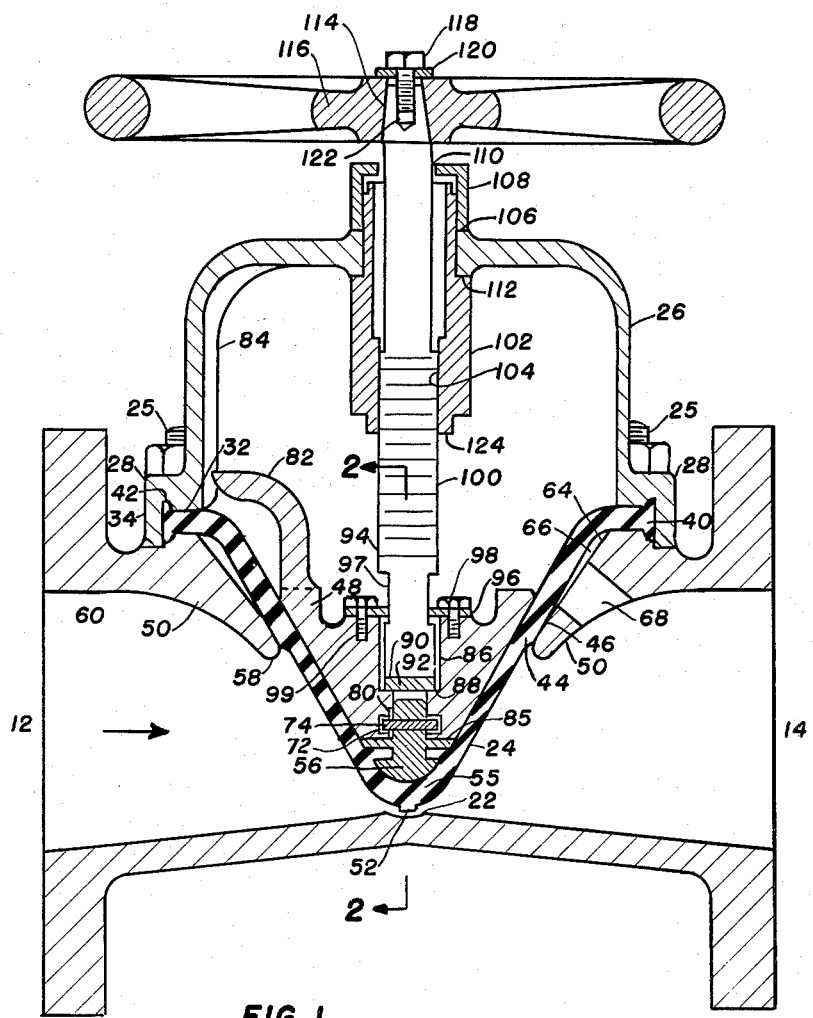

Referring to FIGURES 1 and 2, the numeral 10 indicates the body of a valve having a passageway therethrough extending between inlet 12 and outlet 14. At the center of the body the walls taper upwardly and outwardly as shown at 16, merging into a circular flange or diaphragm seat 20. Intermediate the inlet and outlet, the bottom inside wall of the body is formed with a shallow valley 22 merging into the side walls of the body to form a seat for diaphragm 24. As shown in the drawing, the bottom of inside body wall slopes gently upwardly from inlet and outlet to the center of the valve.

Fastened to the body by means of bolts 25 is a bonnet 26. The bonnet is formed with four equally spaced lugs 28 through which are drilled holes to accommodate bolts 25 passing through matching lugs and holes on the body. The bonnet is formed with a flange 32 matching body flange 20. The lower end of the bonnet is formed with a downwardly extending annular portion 34 in which the body flange 20 nests. The circular edge portion of diaphragm 24 is clamped between flange 20 of the body and flange 32 of the bonnet in fluid tight relationship by means of bolts 25.

As shown in the drawing, the lower inner edge 38 of the bonnet is rounded to create a smooth surface against which the free portion of the diaphragm can roll when the valve is being opened.

The diaphragm is formed of natural and/or synthetic rubber, elastomer, plastic or other flexible material. It may have a thickness of from about 1/8" to 1" depending on the size of the valve and if made of rubber, it is preferably reinforced with duck or other fabric. It has the general contour of an inverted cone with a rounded bottom when in closed position. The edge of the diaphragm is formed with a fishtail 40 which is adapted to seat in a recess 42 formed between bonnet flange 32 and annular portion 34, and in a recess formed between the sloping edge of body flange 20 and annular portion 34. In smaller size valves, i.e., two inches or less and in plastic diaphragms made from relatively stiff material, the portion 43 of the diaphragm which bellies when the valve is opened is somewhat thinner than the edge portion in order to give the diaphragm additional flexibility and avoid scuffing against the bonnet wall. For example, if the diaphragm at the clamped portion is 5/16" thick, the belly portion will be 1/4" thick. The portion 44 of the diaphragm adapted to be clamped between valve seat 46 and compressor 48 is thicker than the portion immediately below. The circular seat 46 is formed on the lower end of annular projection 50. The seat 46 is machined to a smooth surface so that compressor 48 can clamp the diaphragm against the seat in fluid tight relationship. The diaphragm also has a central longitudinal bead or rib 52 adapted to seat in valley 22 and against a machined surface or seat 54 on wall 16 and merge at its ends into portion 44. The center or nubbin portion 55 of the diaphragm is somewhat thickened in order to better withstand the wear to which it is subjected and to permit a metallic plug or attaching means 56 to be molded into or fastened to the center of the diaphragm. The plug 56 has a rounded bottom conforming to the contour of valley 22 and the cross sectional contour of the bottom of the valve. When the valve is assembled plug 56 forms part of the compressor 48.

Returning to downwardly projecting portion 50, the bottom end 58 thereof extends downwardly into valve passageway 60 to approximately the same horizontal plane in which the center bottom 62 of the diaphragm lies when the valve is in fully open position. The circular seat 46 formed on the lower end thereof should be of sufficient width to present an adequate surface for the diaphragm to be clamped tightly against. For example, in a 2 inch valve the seat will have a width of about 3/8 inch. The seat 46 slopes at an angle of about 30° to the vertical whereas the surface 64 of projection 50, above the seat slopes 2 to 5° more so that when the diaphragm is in closed position, as shown in FIGURE 1, a space 66 remains between surface 64 and the diaphragm. The projections 50 have a curvature corresponding to that of body wall 16 so that the projections merge into the side walls, defining an opening in the top of the body that has generally an inverted frustro-conical shape. By placing seat 46 at the lower end of projection 50 the area of the diaphragm which is effective in closing the valve is very considerably reduced thereby requiring less force to close the valve. In order to prevent liquid under pressure from being trapped in the space 66, the projection 50 adjacent the outlet 14 has a port 68 therethrough connecting space 64 to outlet 14.

The compressor 48 conforms in general configuration to an inverted frustrum. The bottom has a center bore 70 which is in turn counter-bored at 72 to provide a circular recess to accommodate cross-pin 74 press-fitted into a horizontal passageway in the upper portion of plug 56. The bottom face of the compressor is slotted across bore 70 as shown at 78 (FIGURE 3) to provide access for the pin 74 into circular recess 72. A vertical pin 80 is press-fitted into a small vertical bore extending upwardly from the bottom face of the compressor through recess 72 and at a position about 60° from the slot 78. Pin 80 acts as a stop for pin 74. When assembled with cross-pin 74 against stop-pin 80 the rib 52 on the diaphragm is lined up with the valve seat 54.

The upper end of compressor 48 is provided with a finger 82, the end of which is adapted to ride in a vertical slot or groove 84 formed on the inside wall of bonnet 26. The finger 82 cooperating with groove 84 prevents the compressor from turning. The bottom face of compressor 48 is adapted to bear on the flat surface 85 of insert 56. The side wall slope of the compressor is the same as that of seat 46 and of seat 54.

The upper surface of the compressor 48 has a central vertical bore 86 which extends to the upper end of bore 70. Bore 86 has a greater diameter than bore 70 to form shoulder 88. A circular bearing plate 90 rests on shoulder 88 and forms a bearing surface for the lower end 92 of stem 94. The end 92 fits loosely in bore 88 and is held in place by horse-shoe shaped washer 96 which fits into stem recess 97 and is fastened to the top surface of compressor 48 by means of screws 98 passing through holes in the washer and threaded into tapped holes 99 in the compressor.

Stem 94 is threaded as shown at 100 and passes through sleeve 102 which is internally threaded at its lower portion 104. Sleeve 102 extends through a central opening 106 in the top of bonnet 26. A nut 108 having a central opening 110 is threaded onto the outer end of the sleeve 102, locking the sleeve tightly against the bonnet by virtue of shoulder 112. The sleeve may be keyed to the bonnet to insure against rotation of the sleeve.

The upper end of stem 94 is tapered inwardly as shown in 114. The taper may be at an angle of approximately 10° to 15° to the vertical. The hub of handwheel 116 has a tapered bore corresponding to the taper on the end of the stem. A lock screw 118 passes through washer 120 and screws into a threaded recess 122 in the top of the stem. When the lock screw is tightened, the handwheel and stem are securely locked together so that they turn as a unit.

It will be apparent that the limit of opening of the valve is controlled by the bottom end 124 of the sleeve 102. When the washer 96 abuts against the bottom end of the sleeve the center of the diaphragm is level with the lower end of projection 50 thereby providing a straight line flow for fluid through the valve.

Figure 4:
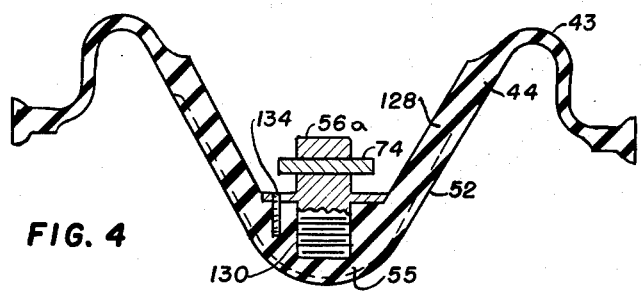
FIGURE 4 is a cross-sectional view of a synthetic plastic diaphragm that may be used in place of the diaphragm shown in FIGURE 1.

Referring now to FIGURE 4 there is shown a full size plastic diaphragm for a two-inch valve. The diaphragm may be molded from plastic highly resistant to chemicals and capable of withstanding elevated temperatures of the order of 350° F. such as Teflon (polytetrafluorethylene) and Kel-F (polymer of trifluorochloroethylene). As will be seen the bellied portion 43 of this diaphragm is considerably thinner than the rest of the diaphragm and the portion 44 which is adapted to be clamped between the body seat and compressor is the thickest except for the central nubbin 55. In the two inch size the bellied portion is preferably about 3/32 inch thick and the portion 44 is preferably about 1/4" thick. The portion 128 between the portion 44 and nubbin 55 is preferably 3/16 inch with a 1/16 inch deep and 3/16" wide bead or rib 52. The nubbin has a threaded recess 130 into which is threaded compressor attachment 56a. The attachment is provided with cross-pin 74 to enable the diaphragm to be fastened to the compressor in the same manner as described in connection with FIGURES 1–3. Attachment 56a is provided with a flange 85 intermediate its ends which lies snugly against the upper face of the nubbin 55. A small screw 134 passes through a hole in the flange and is threaded into a tapped recess in the nubbin to prevent attachment 56a from turning.

The operation of the valve will be apparent from the aforesaid description.

I claim:

1. A diaphragm valve comprising a body having a passageway extending therethrough and a generally circular opening in a side thereof communicating with said passageway, a bonnet secured to said body over said opening, a diaphragm extending across said opening and including a marginal portion having a predetermined minimum diameter secured between said body and said bonnet, said body including inwardly projecting flange means merging with opposite interior side walls of the body and combining with said side walls in providing an annular surface defining said opening, an inner end portion of said surface including an inverted substantially frusto-conical valve seat of a substantial axial extent, said surface being relieved outwardly from said seat for substantially eliminating contact between the diaphragm and the relieved portion of said surface, said seat being spaced substantially both radially and axially of the opening inwardly from said marginal portion of the diaphragm and having a maximum diameter substantially less than said predetermined minimum diameter, said body including a second seat extending transversely of said passageway and intersecting said first mentioned seat at said opposite side walls, and a compressor connected with said diaphragm for positively pressing portions of the diaphragm against said first and second mentioned seats, said compressor having a portion shaped similarly to said first mentioned valve seat and having a maximum diameter at least as large as the minimum diameter of said first-mentioned valve seat, said diaphragm including relatively flexible portions positioned between said valve seats in clamped position whereby substantial compressive force thereon is avoided.

2. A diaphragm valve, as defined in claim 1, wherein said last mentioned diaphragm portions are relatively thin, said diaphragm including a relatively thick annular portion disposed for engagement with said annular valve seat, and a second transversely extending relatively thick portion engageable with said second mentioned seat.

3. A diaphragm valve, as defined in claim 1, wherein said last mentioned diaphragm portions are relatively thin, and a central area of the diaphragm including said portions engageable with the seats is pre-formed and substantially conforms to said compressor.

References Cited in the file of this patent

UNITED STATES PATENTS

| | | |
|---|---|---|
| 639,484 | Woodworth | Dec. 19, 1899 |
| 1,001,624 | Curtin | Aug. 29, 1911 |
| 1,323,195 | LeRoy | Nov. 25, 1919 |
| 1,787,105 | Delany | Dec. 30, 1930 |
| 2,302,930 | Anderson | Nov. 24, 1942 |
| 2,397,373 | Saunders | Mar. 26, 1946 |
| 2,684,829 | McFarland | July 27, 1954 |
| 2,705,124 | Price | Mar. 29, 1955 |
| 2,853,270 | Roteler | Sept. 23, 1958 |
| 2,875,977 | Stone | Mar. 3, 1959 |

FOREIGN PATENTS

| | | |
|---|---|---|
| 526,360 | Belgium | Feb. 27, 1954 |
| 1,080,433 | France | 1954 |
| 1,092,215 | France | 1954 |